Nov. 13, 1923.
G. A. PURDY
1,473,872
TRACTION DEVICE FOR MOTOR VEHICLE WHEELS
Filed March 22, 1920
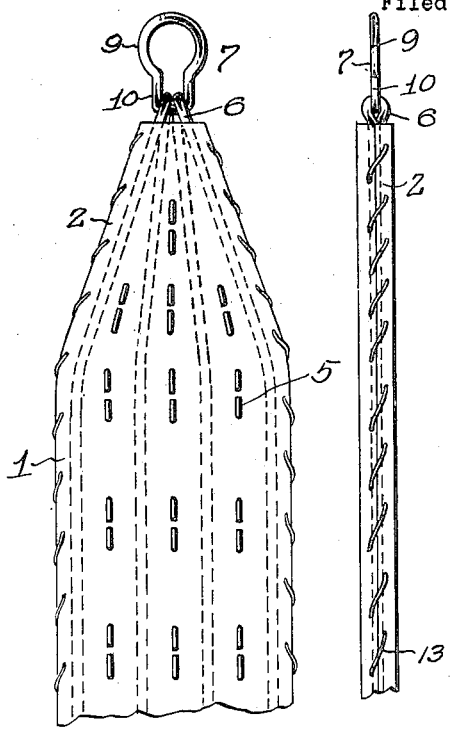
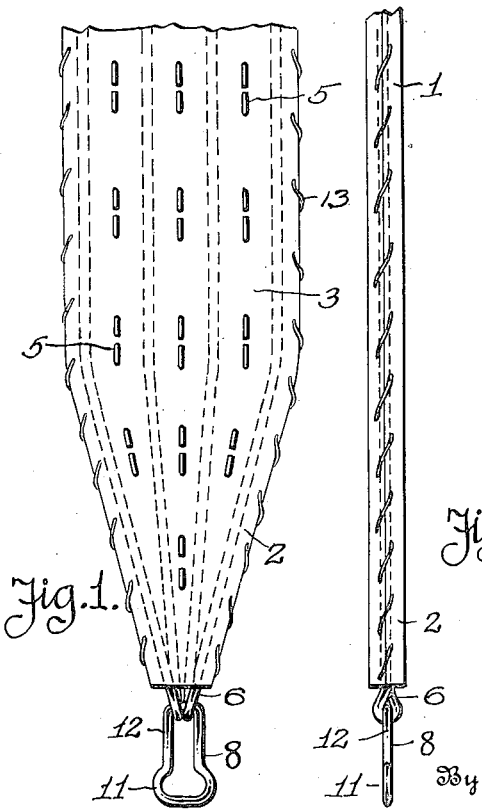
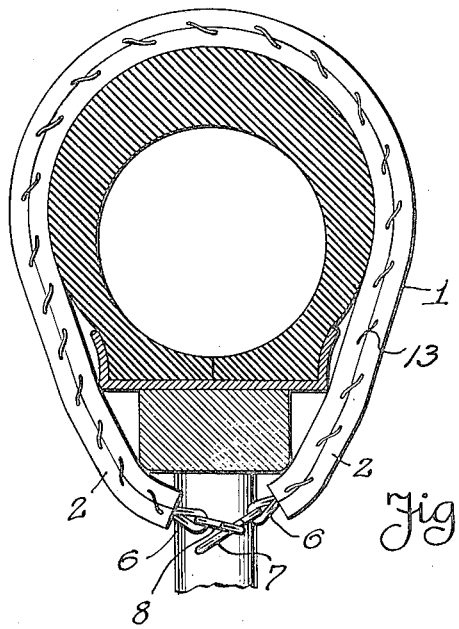
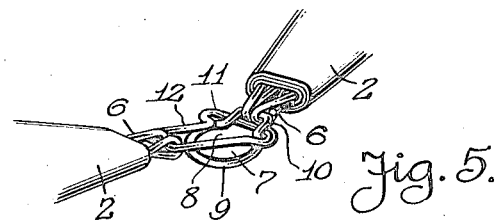
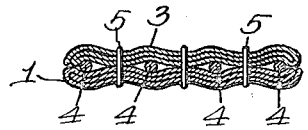
Inventor
George A. Purdy,
By
Attorneys Patented Nov. 13, 1923.

1,473,872

UNITED STATES PATENT OFFICE.

GEORGE A. PURDY, OF SEATTLE WASHINGTON.

TRACTION DEVICE FOR MOTOR-VEHICLE WHEELS.

Application filed March 22, 1920. Serial No. 367,602.

*To all whom it may concern:*

Be it known that I, GEORGE A. PURDY, a citizen of the United States of America, residing at Seattle, in the county of King and State of Washington, have invented certain new and useful Improvements in Traction Devices for Motor-Vehicle Wheels, of which the following is a specification, reference being had therein to the accompanying drawings.

The driving wheels of motor vehicles often spin when power is applied thereto if the wheels are resting upon soft ground or smooth ice, and to give traction many attachments have been devised employing chains and other metal devices with means for fastening these devices over the tread of the wheel. The object of this invention is to provide a device for the purpose which may be quickly attached to the vehicle wheel when needed.

The invention consists in providing a fabricated traction device which may be quickly fastened about the tire and rim of a wheel and will have the necessary strength and wearing qualities. The invention further consists in fabricating a traction member in such a manner as to give the necessary strength without increasing the cost of production to such an extent that the device cannot be sold for a small price. The invention also consists in certain other new and useful features and in the matters hereinafter set forth and more particularly pointed out in the appended claims, reference being had to the accompanying drawing in which Fig. 1 is a plan view of a device illustrative of the invention;

Fig. 2 an edge elevation of the same;

Fig. 3 a transverse section;

Fig. 4 is a view illustrative of the manner in which the device is attached to a motor vehicle wheel, and Fig. 5 is a perspective view of the fastening means.

A device for the purpose which may be cheaply manufactured and sold at a low figure, is provided by forming an elongated body 1 having tapered end portions 2 and which is made up of a number of thicknesses of burlap or other cheap and strong woven fabric which will give the maximum of traction, this fabric being preferably cut in strips folded upon themselves to give the desired number of layers of fabric as illustrated in Fig. 3. These strips are so cut and formed as to produce the body with tapering ends and after the fabric 3 is folded to the proper form with a plurality of thicknesses at each side of the body, longitudinal cords 4 are laid in the body lengthwise thereof to give tensile strength to the body and prevent undue longitudinal stretching under the severe strain when in use. These cords 4 may be of any suitable material, such as metal wires, but preferably are very strong fabric cords which are laid in the body longitudinally thereof and converge in the tapered end portions of the body. Any desired number of these cords may be used but as illustrated there are four cords spaced apart and held in spaced relation within the center of the body by suitable fastening means, indicated at 5, extending through the several fabric layers between the several runs of the cords. The fastening means 5 may be stitching formed by the use of a very strong thread or small cord or wire or other suitable staples may be used and preferably the cords 4 are arranged in pairs, the cord of each pair being made continuous so that loops 6 will be formed at the ends of the body, the looped ends of the cords being extended beyond the tapering ends of the body just sufficiently to engage suitable means for fastening the two ends of the body together about the tire and rim of the vehicle wheel. After the cords have been laid in the body as previously described and secured in spaced relation therein by means of the fastenings 5, the two side edges of the folded fabric forming the two sides or faces of the body, are preferably secured together by stitching 13 of strong thread or cord, or these edges may be connected in any other suitable manner to securely hold the edges together and bind the outer runs of the longitudinal cords in place in the body.

Simple and efficient means for fastening the ends of the body together, which means may be quickly and conveniently connected in placing the device upon a wheel, is illustrated in Fig. 5 wherein a metal loop 7 is attached to one end of the body to pass through another metal loop 8, attached to the other end of the body, said metal loops being formed to interlock after the metal loop 7 has been passed through the loop 8. Preferably the loop 7 is formed with a circular end portion 9 and a laterally extending loop portion 10 adapted to receive the loops 6 of the cords 4 and the metal loop 8 is of somewhat similar form but of less width and greater elongation, it having a head or end portion 11 with a laterally extending elongated neck portion 12 to receive in the end thereof the loops 6. The head 9 of the loop 7 is of such a width that it will readily pass through the loop 8 to a position transversely thereof and will not readily become detached therefrom because of the width of the head 9. The enlarged end 11 of the loop 8 forms a seat for the rounded end portion 9 of the loop 7.

When the driver finds that his driving wheels spin when power is applied he may quickly attach the traction device by wrapping it around the tire and rim, as illustrated in Fig. 4, and engaging the loop 7 with the loop 8, as described, between the spokes of the wheel to connect the ends of the device and securely hold it in place. The fabricated body will adhere with great force to a slippery surface and because of the width of the body, sufficient traction will be given by the placing of one or more of these traction devices on a wheel to move the vehicle out of a hole or from the slippery portion of the roadbed.

Because the fabricated body with its longitudinal strengthening cords is very light in weight, several of these devices may be readily carried in the machine and because of the small cost of manufacture the motorist will not be burdened with undue expenses in providing himself with the necessary number of these devices. It is also obvious that this body may be made up of any desired number of thicknesses of material which may be secured together in any suitable manner and the ends of the body provided with any suitable fastening means.

Changes in the form and construction of the device are therefore contemplated within the scope of the appended claims, and I do not limit myself to the particular construction shown.

Having thus fully described my invention, what I claim is:—

1. A traction device comprising an elongated flat body having tapering ends, and formed of a plurality of layers of fabric, and strengthening cords extending longitudinally of the body in spaced relation and out through the tapering ends of the body, and means at the ends of the body connected to said cords for detachably attaching the device to a vehicle wheel.

2. In a traction device, the combination of a fabricated body comprising a plurality of superposed layers of fabric, and strengthening cords extending longitudinally of the body and formed with loops projecting from the ends of the body, and means for securing the several layers of fabric together between the runs of the cords to space the same apart and hold the fabric together, and fastening means engaged with the projecting looped ends of the cords for fastening the device to a vehicle wheel.

In testimony whereof I affix my signature in the presence of two witnesses.

GEORGE A. PURDY.

Witnesses:
ANNA M. DORR,
ANNA C. RAVILER.